United States Patent [19]

Caldwell

[11] Patent Number: 4,781,948

[45] Date of Patent: Nov. 1, 1988

[54] WATER-BASED FILM-FORMING COATING COMPOSITIONS AND THE USE THEREOF

[75] Inventor: David Caldwell, Sale, England

[73] Assignee: Imperial Chemical Industries PLC, London, England

[21] Appl. No.: 870,864

[22] Filed: Jun. 5, 1986

[30] Foreign Application Priority Data

Jun. 10, 1985 [GB] United Kingdom ............... 8514570

[51] Int. Cl.$^4$ ..................... B05D 3/02; C08K 5/09
[52] U.S. Cl. ............... 427/388.1; 427/388.4;
524/300; 524/320; 524/321
[58] Field of Search ............ 524/320, 300, 321;
427/388.1, 388.4

[56] References Cited

U.S. PATENT DOCUMENTS

| | | |
|---|---|---|
| 2,439,677 | 4/1948 | Shapiro . |
| 3,859,235 | 1/1975 | Vargiu et al. ............... 524/321 |
| 3,901,859 | 8/1975 | Albert et al. ............... 524/320 |
| 4,076,861 | 2/1978 | Furukawa et al. ............ 427/132 |
| 4,087,397 | 5/1978 | Martorano et al. ........... 524/522 |
| 4,104,424 | 8/1978 | Steinbrecher et al. ........ 524/320 |
| 4,229,503 | 10/1980 | Day ........................ 524/300 |
| 4,243,430 | 1/1981 | Sperry et al. ............ 106/308 M |
| 4,419,468 | 12/1983 | Lucas . |
| 4,425,465 | 1/1984 | Padget et al. .............. 524/493 |
| 4,481,116 | 11/1984 | Cabestany et al. ........... 524/300 |
| 4,532,159 | 7/1985 | Caldwell et al. ........... 427/388.1 |

FOREIGN PATENT DOCUMENTS

| | | | |
|---|---|---|---|
| 4616840 | 5/1971 | Japan ..................... 524/320 |
| 1245301 | 9/1971 | United Kingdom ........... 524/300 |
| 1450916 | 9/1976 | United Kingdom . | |

OTHER PUBLICATIONS

Book Review, vol. 54, No. 688, May 1982 p. 101.
New England Society, vol. 54, No. 684, Jan. 1982, pp. 63–68.

*Primary Examiner*—Joseph L. Schofer
*Assistant Examiner*—N. Sarofin
*Attorney, Agent, or Firm*—Cushman, Darby & Cushman

[57] ABSTRACT

An acidic water-based film-forming coating composition suitable for the protection of ferrous surfaces by application thereto and drying at ambient temperature wherein said composition contains at least one acid of defined formula, such as lactic or tartaric acid, which prevents or reduces general yellow/brown staining.

11 Claims, No Drawings

WATER-BASED FILM-FORMING COATING COMPOSITIONS AND THE USE THEREOF

The present invention relates to water-based film-forming coating compositions and more particularly to water-based coating compositions comprising an aqueous latex or dispersion of a film-forming polymer, and the use thereof in providing protective coatings on ferrous metal surfaces.

A wide variety of polymers (both homopolymers and copolymers) may be used as the film-forming component (the "polymeric" binder) in water-based coating compositions for use in the protective coating of ferrous metal surfaces. Such coating compositions comprise (a) an aqueous latex or dispersion of the film-forming polymer, (b) in cases where the coating composition provides a paint, one or more pigments (transparent or translucent film-forming compositions will not of course contain opacifying pigments although they may contain tinting materials) and (c) optionally one or more other components, for example thickeners, dispersing or stabilizing agents, rheology control agents, anti-foam agents, coalescing solvents, plasticisers, wetting agents, and extenders.

A problem that is often encountered with water-based film-forming coating compositions when used in the protection of iron or steel is that known as "flash-rusting"; this term is applied to the development of small discrete or localised areas of rust staining as the applied coating dries. The problem of flash-rusting is especially troublesome when the drying of the applied coating takes place at ambient temperature, i.e. with compositions which do not require a "baking" period for curing or hardening at a temperature substantially above ambient temperature. Since much of the poential use of protective film-forming coating compositions is in their application to structures such as bridges, buildings and storage tanks and large components such as pipe-work, it is clearly desirable that such coating compositions should be capable of being applied by brush, spray or roller and of being dried at ambient temperature without the need for an elavated temperature.

In the formulation of water-based film-forming compositions (particularly paints) capable of drying at ambient temperature it is widely considered in the industry that, in order to minimize flash rusting, it is necessary to employ an alkaline composition, the pH being above 7 either naturally (as a result of the preparation of the coating composition) or by virtue of adding a base. Thus, e.g., UK Pat. No. 1 450 916 describes pigmented corrosion-inhibiting water-based paint compositions (based on an aqueous polymer latex) containing a water-soluble complex of a polyvalent transition metal with a volatile complexing agent and a corrosion inhibiting anion; in the formulation of such compositions, ammonium hydroxide is added to bring the pH to a value of 7.5 to 10. In this respect work has also been carried out fairly recently (see Journal of Coatings Technology, Vol. 54; January 1982, pages 63–68 and the follow-up letters in May 1982, page 101 of the same volume) whereby flash-rusting has been minimized in water-based paints at pH 9.0 by the incorporation of certain inorganic and organic compounds such as sodium nitrate, sodium nitrite, alkyl imidazole, calcium octoate and sodium benzoate.

In a further advance on this art, it is disclosed in our European Patent Publication No. 0035316 that flash-rusting incurred with a wide variety of water-based paints capable of being applied and dried at ambient temperature can be minimized or prevented by employing an acidic paint formulation of pH 3 to 6.5, more preferably 4 to 5.5. However, while this technique is undoubtedly effective for achieving low susceptibility to localized flash-rusting, further investigation has revealed that its use may incur the formation of another unwanted effect, namely the formation of a more generally distributed yellow-brown staining of the coating; this is not or hardly visible in dark-coloured paints but is clearly noticeable in white or pale-coloured paint films and also in clear or translucent films. It is believed that this staining involves incorporating iron from the substrate into the film.

We have now discovered that the formation of this unwanted staining may be avoided or considerably reduced, even under adverse drying conditions, by incorporating certain organic carboxylic acids into the acidic water-based film-forming coating composition.

According to the present invention there is provided an acidic water-based film-forming coating composition capable of forming a protective coating by application to a ferrous substrate followed by drying at ambient temperature, wherein said composition comprises an aqueous latex or dispersion of a film-forming polymer, and wherein said composition also contains at least one carboxylic acid of formula $R-(X)_n-CO_2H$ where R is carboxyl, H, or lower alkyl (1 to 5 carbon atoms), X is $-CH(OH)-$, and n is 0, 1, 2, or 3.

If R is lower alkyl it is preferably an alkyl group of 1 to 3 carbon atoms.

The composition of the invention may optionally comprise at least one corrosion-inhibiting pigment although, as indicated above, the utility of the invention will be more pronounced if the pigment provides a pale or light colouration or if the composition is unpigmented or transparent.

It is to be understood that the carboxylic acid defined above might possibly be present in the composition at least partly in the form of a carboxylate salt such as an alkaline earth metal carboxylate, and the above formula is intended to embrace such cases where the carboxylic acid is present at least partly in salt form.

According to another aspect of the invention there is provided a method of protecting a ferrous substrate which comprises applying to said substrate a coating of a water-based film-forming coating composition as defined above.

The compositions of the invention provide other advantages additional to that described heretofore. It is known to coat ferrous metal substrates with anticorrosive coating compositions comprising a polymeric binder and a rust converter compound such as tannic acid. The presence of the rust converter may result in areas of discolouration in the applied coating (possibly due to the formation of coloured iron compounds with the rust converter). If a composition according to the invention is applied to such a coated ferrous substrate (i.e. provides an overcoat) and dried it is found that the discolouration is removed or considerably reduced (even if the coating composition according to invention which is applied is white, palecoloured). Accordingly it should be noted that the term "ferrous substrate" is intended to include a ferrous substrate that has already been coated with a coating composition, e.g. a binder/rust converter-containing composition (as described above).

Still further, the composition of the invention provides an anti-corrosive protection coating of improved anti-corrosion performance on parts of a ferrous substrate which have been damaged and so have the metal surface exposed. Thus such a coating imparts increased protection to corrosive environments (e.g. salt spray) in comparison to a coating derived from a composition which is similar but does not contain a carboxylic acid as defined above.

Particularly effective examples of carboxylic acids (as defined) for use in the invention are oxalic acid ($R=CO_2H$, $n=0$), formic acid ($R=H$, $n=0$), tartaric acid ($R=CO_2H$, $X=CH(OH)$, $n=2$), and lactic acid ($R=CH_3$, $X=CH(OH)$, $n=1$). Of these tartaric and lactic acids are more preferred since they are nontoxic, whereas oxalic acid and formic acid are poisonous.

The at least one organic carboxylic acid is preferably present in an amount of 0.01 to 10%, more preferably 0.01 to 5% by weight, and particularly 0.5 to 2% by weight, based on the weight of the coating composition.

The pH of compositions according to the invention is preferably in the range of from 1 to 4.

The pH of pigmented composition according to the invention (e.g. paints) is generally about 3, while transparent/translucent film-forming coating compositions according to the invention usually have pH of about 1.

The film-forming polymer is preferably a polymer comprising units derived from one or more monoethylenically unsaturated monomers containing one or more (but more preferably one) olefinic, vinyl, or vinylidene groups.

The polymers which may be used as the film-forming polymer (the "polymeric binder") in the aqueous latex used in the present invention include homopolymers and copolymers of the following: vinyl chloride, vinylidene chloride, vinyl esters of alkanoic acids having from 1 to 18, carbon atoms in the alkyl group, especially vinyl acetate, acrylic and methacrylic esters of alkanoic acids having from 1 to 18 carbon atoms in the alkyl group, especially the said esters having from 1 to 12 carbon atoms in the alkyl. group, for example the methyl, butyl or 2- ethylhexyl esters, acrylonitrile, and methacrylonitrile, monoethylenically unsaturated hydrocarbons, for example ethylene, isobutene, styrene and alpha-methyl styrene.

The polymers may also (optionally) contain polymerised units of a small proportion of one or more aliphatic alpha-beta unsaturated carboxylic acids. The proportion of such acid(s) may be, for example, from 0.2 parts to 10 parts by weight per hundred parts of the total monomer components of the polymer. Acids which may be used include acrylic, methacrylic, itaconic and citraconic acids.

The present invention is especially advantageous when the polymer in the aqueous latex is a copolymer comprising polymerised units of vinyl chloride, vinylidene chloride and one or more alkyl acrylates or alkyl methacrylates having from 1 to 12 carbon atoms in the alkyl groups; such polymers may optionally also contain polymerised units of one or more aliphatic alpha-beta unsaturated carboxylic acids. Examples of such copolymers are those described generally and specifically in the specifiction of our UK Patent No. 1 558 411. Such copolymers tend to yield coating compositions which are acidic (pH<7), and even if these are rendered alkaline they tend to revert to being acidic on storage.

The corrosion-inhibiting pigment if used is usually zinc phosphate in our compositions although no doubt others could be used.

In addition to the optional use of a corrosion-inhibiting pigment, the composition (if paint-forming) will often contain a colour-hiding pigment (usually a hiding white pigment, although other tints and colours may be utilized). Typically such a pigment is titanium dioxide which is preferred. As indicated above, the colour-hiding pigment should preferably be white or pale-coloured to achieve maximum utility of the invention.

The composition may also include various other ingredients commonly employed in film-forming coating formulations, such as defoamers, rheology control agents, thickeners, dispersing and stabilizing agents (usually surfactants), wetting agents, extenders, fungicides, coalescing solvents, plasticisers, and antifreeze agents.

The composition of the invention may be applied to a wide variety of ferrous substrates, for example clean or rusty steel which has been blasted by steel shot or by other means. The compositions may be applied by conventional techniques for the application of a coating to a substrate, for example by brush, spray, roller, or dipping.

The present invention is illustrated by the following examples, with comparative examples being denoted by the prefix C. Unless otherwise specified all parts and percentages are by weight.

EXAMPLES C1, 2 to 4, C5 to C7

In these and following examples there was used an aqueous latex of a film-forming copolymer of vinylidene chloride, vinyl chloride, and other acrylic monomers marketed by Imperial Chemical Industries PLC as "Haloflex" 202 (solids content of latex about 60%).

A premix dispersion having the following formulation was prepared:

|  | Parts |  |
|---|---|---|
| Water | 5.07 |  |
| "Bevaloid" 642 | 0.22 | (defoamer) |
| "Polywet" ND2 | 0.53 | (wetting agent) |
| "Primal" RM8 | 0.27 | (thickener) |
| "Synperonic" NP30 (20% solution) | 5.54 | (surfactant) |

To this premix were added the following pigment-providing materials:

|  | Parts |  |
|---|---|---|
| Zinc phosphate | 5.54 | (pigment) |
| "Mistron" 754 (magnesium silicate) | 11.75 | (extender) |
| Titanium dioxide | 8.88 | (pigment) |

To the resulting pigment-containing dispersion were added the following materials (let-down):

|  | Parts |  |
|---|---|---|
| Water | 10.73 |  |
| "Haloflex" 202 | 49.28 |  |
| Butyl "Ethoxol" (butyl glycol) | 2.09 | (coalescing solvent) |

To samples of the resulting white paint composition were added candidate carboxylic acids as indicated in the following Table 1, the acids being added to give a level thereof of 1% w/w on the paint composition. The resulting compositions (pH about 3 with added carboxylic acid) were applied to shot-blasted steel panels (having a maximum profile of 75 microns) using a cube applicator with a 200 micron gap. The wet film was allowed to dry using two methods:

(a) normal drying; the wet paint film was allowed to dry under ambient temperature in the laboratory, (b) high humidity drying: the wet paint film (on its support) was first placed in an atmosphere of 100% relative humidity for 30 minutes, removed and then allowed to dry under ambient temperature as per (a).

The effect of the additives on the resulting paint colour after drying is shown in Table 1:

TABLE 1

| Ex No | Carboxylic Acid additive | Visual Effect | |
|---|---|---|---|
| | | normal drying | high humidity drying |
| C1 | none (control) | creamy (slightly yellow) | creamy (slightly yellow) |
| 2 | oxalic acid | white | white |
| 3 | lactic acid | slightly off white | slightly off white |
| 4 | tartaric acid | slightly off white | slightly off white |
| C5 | succinic acid | dark pink | purple and rust-staining |
| C6 | glutaric acid | brown/purple | severe rust staining |
| C7 | citric acid | pink/brown | light brown |

The advantageous effect of including the carboxylic acids according to the invention (as compared to a control or acids not according to the invention) is self-evident.

EXAMPLES C8, 9 to 11

A transparent film-forming coating composition was prepared having the following formulation:

| | parts | |
|---|---|---|
| "Haloflex" 202 | 83.08 | |
| "Thickener" LN (7.5% w/w) | 2.00 | (thickener) |
| Butyl "Ethoxol" (butyl glycol) | 13.92 | (coalescing solvent) |

To samples of the resulting unpigmented coating composition were added candidate carboxylic acids as indicated in the following Table 2 the acids being added to give a level of 1% w/w on the coating composition. The resulting compositions (pH about 1 with added carboxylic acid) were applied to abraded steel panels using a cube applicator with a 100 micron gap and allowed to dry (normal conditions). The effect of the additives is shown in Table 2.

TABLE 2

| Ex No | Carboxylic Acid additive | Rust Staining after normal drying |
|---|---|---|
| C8 | none (control) | moderate |
| 9 | oxalic acid | very slight |
| 10 | tartaric acid | none |
| 11 | lactic acid | slight |

The advance of the present invention is again readily apparent.

I claim:

1. A method of protecting a ferrous substrate which method comprises (a) applying to said substrate an acidic water-based film-forming coating composition which comprises an aqueous latex or dispersion of a film-forming polymer, and also contains at least one crboxylic acid of formula $R-(X)_n-CO_2H$ where R is carboxyl, H or lower alkyl (1 to 5 carbon atoms), X is $-CH(OH)-$, and n is 0, 1, 2, or 3, and (b) allowing the applied aqueous coating composition to dry at ambient temperature thereby to form by such drying a protective coating on the substrate.

2. A method according to claim 1 wherein the lower alkyl group of said carboxylic acid contained in the applied composition has 1 to 3 carbon atoms.

3. A method according to either claim 1 or claim 2 wherein said composition which is applied to the ferrous substrate comprises at least one corrosion inhibiting pigment.

4. A method according to any one of claims 2, 3 or 1 wherein the pH of said composition which is applied is in the range of from 1 to 4.

5. A method according to any one of claims 2-4 or 1 wherein the at least one carboxylic acid employed is selected from oxalic acid, formic acid, tartaric acid and lactic acid.

6. A method according to any one of claims 2-5 or 1 wherein the amount of said at least one carboxylic acid used is 0.01 to 10% by weight based on the weight of the coating composition.

7. A method according to claim 6 wherein the amount of said carboxylic acid used is 0.5 to 2% by weight based on the weight of the coating composition.

8. A method according to any one of claims 2-7 or 1 wherein said film-forming polymer used is a polymer comprising units derived from one or more monethylenically unsaturated monomers containing one or more olefin, vinyl, or vinylidene groups.

9. A method according to claim 8 wherein said film-forming polymer used is a copolymer comprising polymerised units of vinyl chloride, vinylidene chloride, and one or more alkyl acrylates or alkyl methacrylates having from 1 to 12 carbon atoms in the alkyl groups.

10. A method according to either claim 8 or claim 9 wherein said film-forming polymer used contains polymerised units of one or more aliphatic alpha-beta unsaturated carboxylic acids.

11. A method according to any one of claims 2-10 or 1 wherein said composition which is used contains a colour-hiding pigment.

* * * * *